United States Patent
Edler et al.

(10) Patent No.: US 6,360,200 B1
(45) Date of Patent: *Mar. 19, 2002

(54) PROCESS FOR REDUCING REDUNDANCY DURING THE CODING OF MULTICHANNEL SIGNALS AND DEVICE FOR DECODING REDUNDANCY-REDUCED MULTICHANNEL SIGNALS

(75) Inventors: Bernd Edler; Hendrik Fuchs, both of Hannover (DE)

(73) Assignee: Robert Bosch GmbH, Stuttgart (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/983,399
(22) PCT Filed: Jul. 3, 1996
(86) PCT No.: PCT/DE96/01181
 § 371 Date: Apr. 2, 1998
 § 102(e) Date: Apr. 2, 1998
(87) PCT Pub. No.: WO97/04621
 PCT Pub. Date: Feb. 6, 1997

(30) Foreign Application Priority Data

Jul. 20, 1995 (DE) .......................... 195 26 366

(51) Int. Cl.[7] .............................. G10L 19/00; H04S 3/00
(52) U.S. Cl. ...................... 704/219; 704/201; 704/500; 704/501; 381/1
(58) Field of Search ................ 704/219, 500, 704/501, 201; 381/1; 708/318

(56) References Cited

U.S. PATENT DOCUMENTS

| | | | | | |
|---|---|---|---|---|---|
| 4,815,132 | A | * | 3/1989 | Minami | 381/1 |
| 5,249,205 | A | * | 9/1993 | Chennakeshu et al. | 375/101 |
| 5,511,093 | A | * | 4/1996 | Edler et al. | 375/240 |

OTHER PUBLICATIONS

Deller et al "discrete time processing of speech signals" Prentice–Hall, pp. 39296–304,325, 1993.*

Ling et al "A generalized multichannel least squares lattice algorithm based on sequential processing stages" IEEE , 381–389, Apr. 1984.*

Ling et al "Adaptive lattice decision–feedback equalizerss–" IEEE, pp. 348–356, Apr. 1985.*

N.S. Jayant et al., "Digital Coding of Waveforms," Prentice Hall, 1994.

* cited by examiner

*Primary Examiner*—William Korzuch
*Assistant Examiner*—Susan McFadden
(74) *Attorney, Agent, or Firm*—Kenyon & Kenyon

(57) ABSTRACT

A redundance reduction method used in coding multichannel signals is proposed, where signals available in digitized form are predicted. A prediction error is computed, which is subsequently quantized and loaded for transmission over a transmission path. In the method, prediction is performed linearly in a backward-adaptive fashion for at least two channels simultaneously, and the statistical relationships of the signals within a channel and between at least two channels is taken into account. A device for decoding redundance-reduced multichannel signals is proposed. It comprises a linear backward-adaptive predictor for at least two channels.

16 Claims, 7 Drawing Sheets

PROCESS FOR REDUCING REDUNDANCY DURING THE CODING OF MULTICHANNEL SIGNALS AND DEVICE FOR DECODING REDUNDANCY-REDUCED MULTICHANNEL SIGNALS

FIELD OF THE INVENTION

The present invention relates redundance reduction method used in coding of signals and further relates to a device for decoding redundance-reduced signals.

BACKGROUND INFORMATION

German Patent 43 20 990 A1 describes a redundance reduction method used in coding multichannel signals. In particular, the coding of dual-channel audio signals is described. For the purpose of redundance reduction, the signals are sampled, quantized, and predictively coded in an encoder. Estimated values for the actual sampled values are obtained. The prediction error is determined and loaded for transmission over a data line. The predictive coding is an adaptive interchannel prediction, i.e., use is made of the statistical relationship between the signals in the two channels (cross-correlation). The predictor coefficients must be transmitted to the receiver as lateral information.

U.S. Pat. No. 4,815,132 describes a redundance reduction method used in coding dual-channel signals that are available in digitized form. The digitized signals are predictively coded, and a prediction error between the digitized and predictively coded signals is determined. The prediction error values are quantized and loaded for transmission over a transmission path. Linear backward-adaptive prediction is performed for two channels simultaneously, with the statistical relationships within a channel and between two channels taken into account. Furthermore, U.S. Pat. No. 4,815,132 describes the use of a linear backward-adaptive predictor that receives the quantized prediction values of two channels.

WO A-9016136 discloses predictors with a lattice-type structure.

A backward-adaptive predictor for the case of a single channel is described in N. S. Jayant, P. Noll, "Digital coding of waveforms," Prentice-Hall, Englewood, N.J., 1984.

In P. Cambridge, M. Todd, "Audio Data Compression Techniques," 94$^{th}$ AES Convention, Preprint 3584 (K1-9), Berlin, March 1993, the possibility of using auto-correlations and cross-correlations for a predictor for two stereo channels is mentioned. No specific implementation is suggested, however.

SUMMARY OF THE INVENTION

The method according to the present invention provides the advantage that coding is not degraded by prediction. Another advantage is that linear and backward-adaptive prediction is carried out jointly for at least two channels; the statistical linkages are made use of not only between the channels, but are also taken into account within each individual channel. Thus it is achieved that the quality of the prediction is improved and a higher prediction gain is made possible in many signal ranges. For example, in coding audio signals with a data rate of 64 kbit/s, the quality of the transmitted signals can be significantly improved.

The present invention relates to predictors in general for the case of N channels; i.e., more than one channel can be predicted at a time, making use of the statistical linkages both within a single channel (auto-correlations) and between the channels (cross-correlations). A clear prediction gain is thus achieved in comparison with the single-channel case, where only autocorrelation is used.

By performing backward-adaptive prediction, the predictor coefficients may be calculated from the values already transmitted, so that the predictor coefficients do not need to be transmitted. This is not possible in the case of forward-adaptive predictors, where the predictor coefficients would also have to be transmitted to the receiver, which would result in increased data transmission load.

The present invention provides the advantage that signal prediction may be performed in stages with a lattice-type structure used for each predictor stage. This results in an orthogonal system being formed, at least in the case of steady-state signals, which allows for simple variation of the order of the predictors, since adding a stage to the existing stages does not affect the previous stages. Therefore the optimum predictor from the point of view of computer load and prediction quality may be selected in each specific case.

In order to adaptively compute the predictor coefficients, the sum of error signal intensities is determined in the at least two channels. For this purpose, the expectation values for the error signals in the at least two channels are needed. It is advantageous if the expectation values are replaced by mean values over a certain signal history period. The computer load is significantly reduced in this manner.

It is also advantageous when individual predictor stages are designed so that they can be switched off. This allows the predictor to react flexibly if, for example, instability occurs in a prediction. In backward-adaptive systems, this may occur, for example, if the signal statistics are changed due to a signal change.

It is also advantageous when the stages that have been switched off continue to operate as backward-adaptive predictors in the forward feed direction. Thus it is achieved that the predictor coefficients even of the stages that have been turned off are further adapted, so that when those stages are switched on again, the corresponding predictor coefficients do not need to be adapted completely anew.

Furthermore, it is advantageous when use is also made of the statistical relationships between simultaneous sampling values in at least two channels (cross-correlations). For this purpose, a simple zero-order inter-channel predictor may be connected downstream. This results in a prediction gain, for example, in coding audio signals, in particular for monotype signals when, e.g., the signals of the channels only differ in their amplitudes.

In addition, it is also advantageous when the multichannel signals are decomposed into their spectral components, for example, using a filter array or a transformation, and the multichannel spectral components thus obtained are coded separately, the prediction for the spectral components of the at least two channels being performed separately. This has the advantage of allowing flexible and effective control of the predictors. If no signal components are present in a subband, or no prediction gain is achieved, the corresponding predictor can be switched off. Implementation with a plurality of lower-order predictors is often simpler than with one higher-order broad-band predictor.

DETAILED DESCRIPTION OF THE INVENTION

Figure 1:
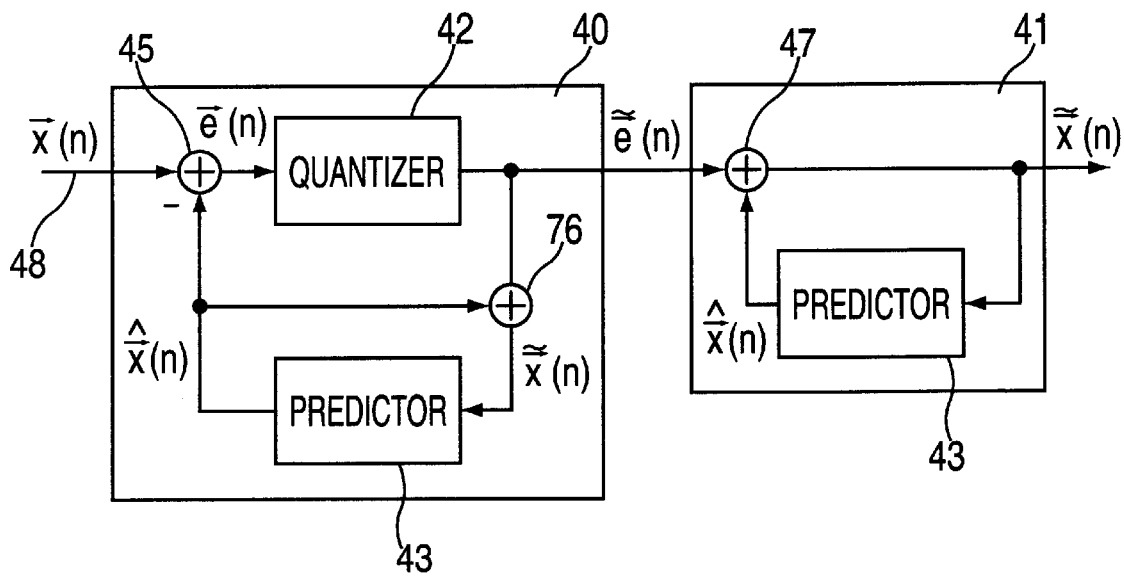
FIG. 1 shows a block diagram of an N-channel coder with N-channel prediction in accordance with the present inventing.
Figure 1A:
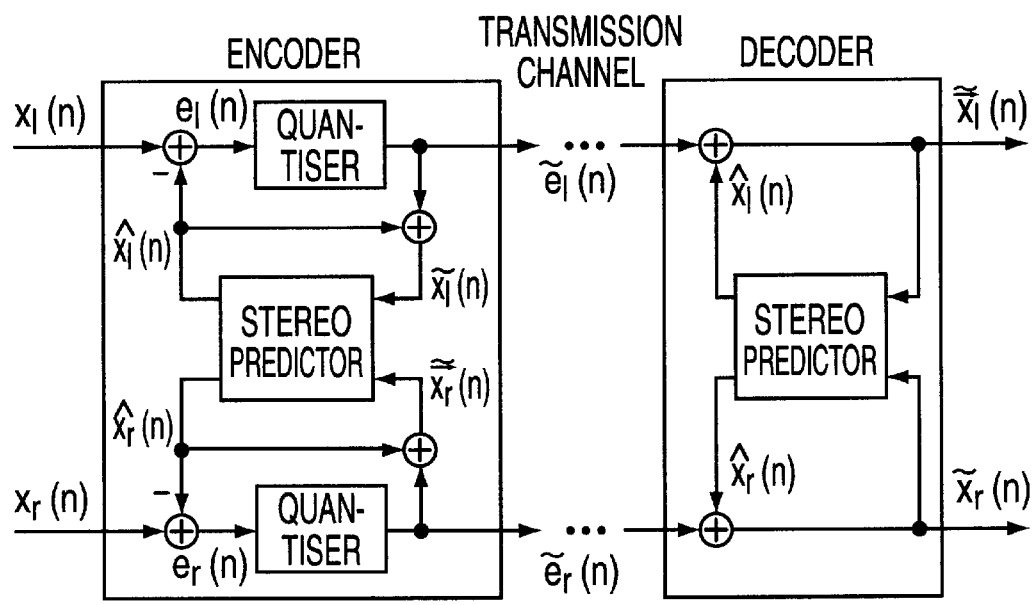
FIG. 1a shows a special case of FIG. 1, in which N=2 for an N-channel predictor that reduces to a stereo predictor, so that FIG. 1a shows an ADPCM-System with stereo prediction for a pair of corresponding (subband) signals $x_l(n)$ and $x_r(n)$ of the left and right channels of a stereo signal.

FIG. 1 shows an encoder 40, which receives a multichannel input signal $\vec{x}(n)$ at input 48 n denotes a natural number and provides the nth sampling time of the analog input signal $\vec{x}(n)$. Encoder 40 also comprises an N-channel quantizer 42 and an N-channel predictor 43. At adder 45, the predictor output signal $\hat{\vec{x}}(n)$ is subtracted from input signal $\vec{x}(n)$. A prediction error signal $\vec{e}(n)$ is obtained, which is sent to N-channel quantizer 42. Then at the output of N-channel quantizer 42, the quantized prediction error signal $\tilde{e}(n)$ appears, which is added to predictor output signal $\hat{\vec{x}}(n)$ in adder 46 of encoder 40. This results in the quantized signal $\tilde{x}(n)$ for the N-channel predictor. The quantized prediction error signal $\tilde{e}(n)$ appears at the output of encoder 40, which signal is transmitted over a transmission path to an input of decoder 41. Decoder 41 also comprises an N-channel predictor 43, which has the same structure as the N-channel predictor in encoder 40. The quantized prediction error signal that appears at the input is added to the predictor output signal $\hat{\vec{x}}(n)$, output by the N-channel predictor, in an adder 47. The quantized signal $\tilde{x}(n)$ is thus obtained, which is sent to the input of N-channel predictor 43. After decoder 41 is switched on, a transient process takes place first, during which the predictor output signals $\hat{x}(n)$ are not yet equal to those of N-channel predictor 43 in encoder 40. In this phase, the quantized signal $\tilde{x}(n)$ output must still be suppressed. After the transient process, both predictor signals will be automatically the same due to the convergence of the computation equations.

The following remarks are in order concerning the notation. The aforementioned signals are written as vector signals. The vectors correspond to an N-channel signal.

$$\vec{x}(n) = \begin{bmatrix} x_1(n) \\ x_2(n) \\ \vdots \\ x_N(n) \end{bmatrix}, \hat{\vec{x}}(n) = \begin{bmatrix} \hat{x}_1(n) \\ \hat{x}_2(n) \\ \vdots \\ \hat{x}_N(n) \end{bmatrix}, \tilde{\vec{x}}(n) = \begin{bmatrix} \tilde{x}_1(n) \\ \tilde{x}_2(n) \\ \vdots \\ \tilde{x}_N(n) \end{bmatrix} \quad (1)$$

represent the N-channel input signal, the N-channel predictor output signal, and the quantized N-channel signal, and $$\vec{e}(n) = \begin{bmatrix} e_1(n) \\ e_2(n) \\ \vdots \\ e_N(n) \end{bmatrix}, \tilde{\vec{e}}(n) = \begin{bmatrix} \tilde{e}_1(n) \\ \tilde{e}_2(n) \\ \vdots \\ \tilde{e}_N(n) \end{bmatrix} \quad (2)$$

represent the N-channel prediction error signal and the quantized prediction error signal.

The computation of the predictor output signal is explained in more detail below. N-channel predictor 43 has an order P and is described by the P matrices of the predictor coefficients $$A_m(n) = \begin{bmatrix} a_{11,m}(n) & a_{12,m}(n) & \cdots & a_{1N,m}(n) \\ a_{21,m}(n) & a_{22,m}(n) & \cdots & a_{2N,m}(n) \\ \vdots & \vdots & \cdots & \vdots \\ a_{N1,m}(n) & a_{N2,m}(n) & \cdots & a_{NN,m}(n) \end{bmatrix}, 1 \le m \le P \quad (3)$$

where m and P are natural numbers. To calculate predictor output signal $\hat{\vec{x}}(n)$, i.e., the estimated values for the instantaneous sampled value in each channel, $$\hat{\vec{x}}(n) = \sum_{m=1}^{P} A_m(n) \cdot \tilde{\vec{x}}(n-m) \quad (4)$$

applies. Then the N-channel prediction error signal $\vec{e}(n)$ is calculated according to $$\vec{e}(n) = \vec{x}(n) - \hat{\vec{x}}(n). \quad (5)$$

For the quantized prediction error signal the following applies:

$$\tilde{\vec{e}}(n) = \vec{e}(n) + \vec{q}(n) \quad (6)$$

and therefore for the quantized input signal $$\tilde{\vec{x}}(n) = \hat{\vec{x}}(n) + \tilde{\vec{e}}(n) = \vec{x}(n) + \vec{q}(n). \quad (7)$$

where $\vec{q}(n)$ is a type of quantizing error signal, which, however, is not used later in the computation.

The predictor coefficients in the matrices $A_m(n)$ are calculated by minimizing the sum of the prediction error signal intensities $$E[\vec{e}^T(n) \cdot \vec{e}(n)] \to \min. \quad (8)$$

In equation 8, $\vec{e}^T(n)$ is the transposed vector of $\vec{e}(n)$. The prediction gain is then provided by the following formula:

$$G_{(dB)} = \sum_{i=1}^{N} 10 \cdot \log_{10} \frac{\sigma_{x_i}^2}{\sigma_{e_i}^2}. \quad (9)$$

In equation 9, it has been assumed that these are average-free signals, for which the formulas $\sigma_{xi}2=E[x_i^2(n)]$ and $\sigma_{ei}2=E[e_i^2(n)]$ also apply. $\sigma_{xi}^2$ and $\sigma_{ei}^2$ are the variances of the corresponding values $x_i$ and $e_i$.

The implementation of N-channel predictor 43 is explained below with reference to FIG. 2. Predictor 43 has a lattice-type structure, which is conventional in single-channel predictors. Reference is made in this respect to the book by P. Strohbach "Linear Prediction Theory," Springer Verlag, pp. 158–178, 1990. A substantial advantage of the lattice-type structure is that, with it, an orthogonal system is formed, which allows the predictor order to be varied in a simple manner by cascading the predictor basic stages, since adding another stage does not affect the previous stages. According to this invention, this structure also applies to the case of N channels and is explained in detail below.

Figure 2:
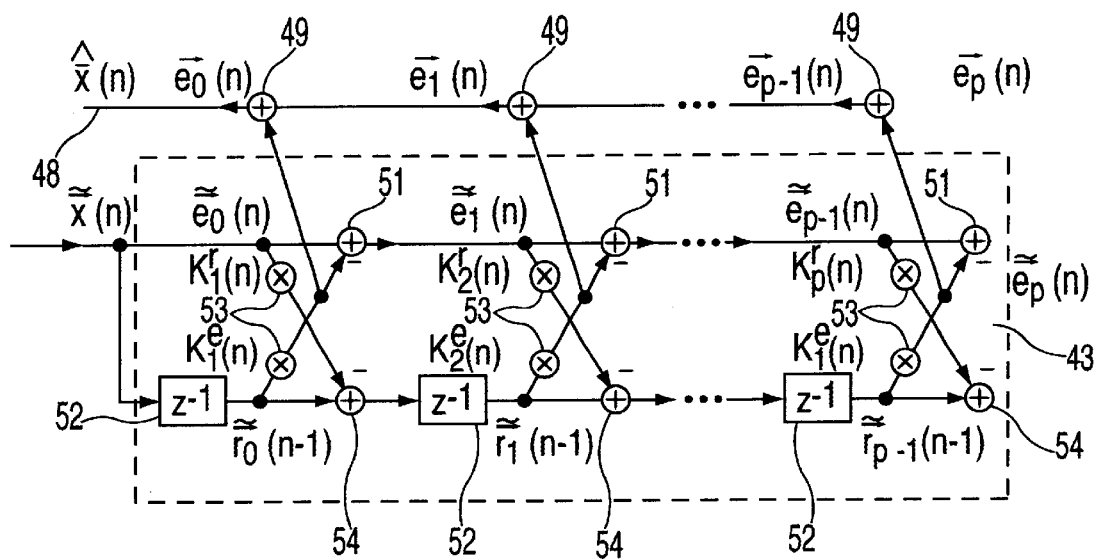
FIG. 2 shows the design of a $P^{th}$-order backward-adaptive N-channel predictor with lattice-type structure in accordance with the present invention.
Figure 2A:
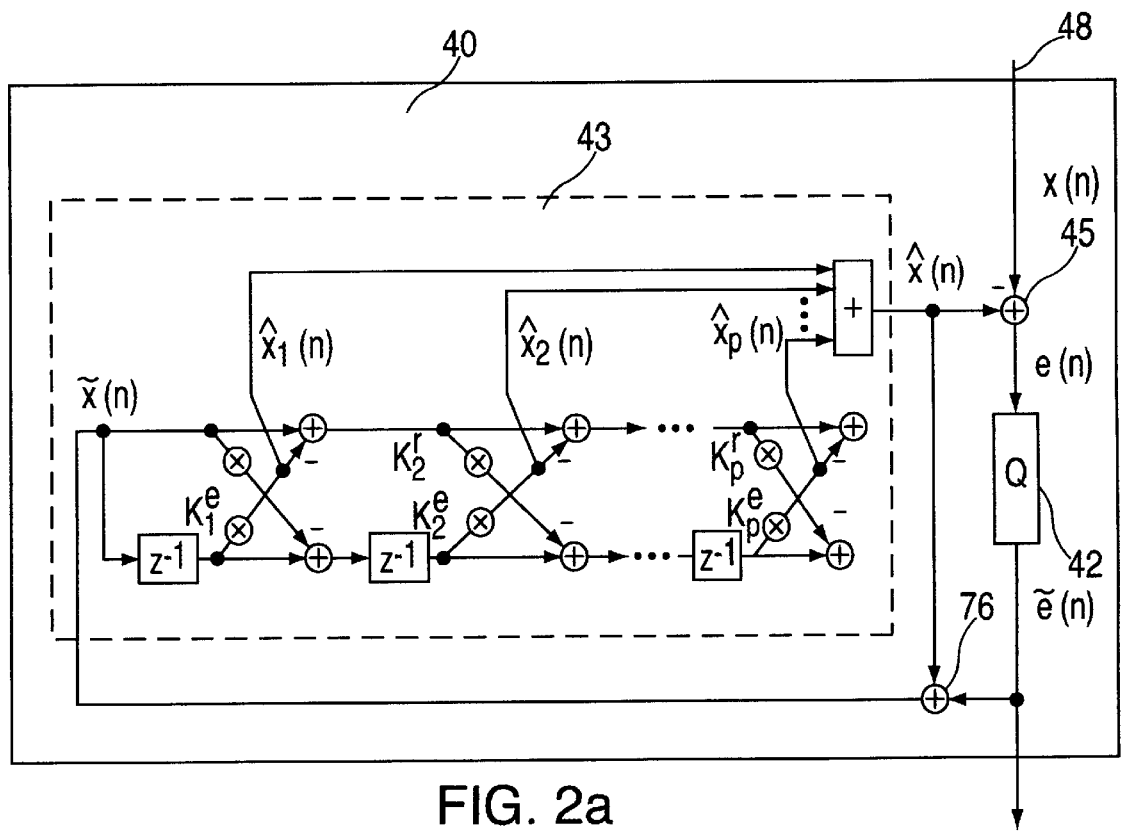
FIG. 2a shows another representation of FIG. 2.

The N-channel predictor illustrated in FIG. 2 comprises P stages and is thus of the Pth order. On the left side, the N-channel input signal $\tilde{x}$ (n) appears. Certain components are combined in adders 49. If the components are combined, these components correspond to the predictor output signal $\hat{x}$ (n) shown in FIG. 1, in which prediction error signal $\tilde{e}(n)$ signal is supplied to N-channel quantizer 42. At adder 51, a contribution, calculated in a predictor stage, is added to the quantized prediction error signal output by the N-channel quantizer 42. Combined, these additions yield the quantized N-channel signal $\hat{x}$ (n). This signal is supplied to the input of N-channel predictor 43, as also shown in FIG. 1. Time delay relays 52 delay the value of the signal that appears by a sampling interval. Multipliers 53 multiply the corresponding input vectors with the matrices of the so-called reflection or Parcor coefficients. Finally the input vectors illustrated in FIG. 2 are added in adder 54, resulting in auxiliary signals that are only used internally in N-channel predictor 43. Attention must be paid to the algebraic signs when adding the respective input vectors as shown in the figure.

Now we shall discuss the mathematical description of this N-channel predictor structure and the computation of the predictor coefficients, which are also referred to as reflection or Parcor coefficients. The mth stage of the N-channel predictor is described by the recursion equations $$\vec{e}_m(n) = \vec{e}_{m-1}(n) - K_m^e \cdot \vec{r}_{m-1}(n-1) \quad \vec{r}_m(n) = \vec{r}_{m-1}(n-1) - K_m^r \cdot \vec{e}_{m-1}(n) \quad (10)$$

with the vectors $$\tilde{\vec{x}}(n) = \begin{bmatrix} \tilde{x}_1(n) \\ \tilde{x}_2(n) \\ \vdots \\ \tilde{x}_N(n) \end{bmatrix}, \tilde{\vec{e}}_m(n) = \begin{bmatrix} \tilde{e}_{1,m}(n) \\ \tilde{e}_{2,m}(n) \\ \vdots \\ \tilde{e}_{N,m}(n) \end{bmatrix}, \tilde{\vec{r}}_m(n) = \begin{bmatrix} \tilde{r}_{1,m}(n) \\ \tilde{r}_{2,m}(n) \\ \vdots \\ \tilde{r}_{N,m}(n) \end{bmatrix} \quad (11)$$

and matrices of the reflection coefficients $$K_m^e(n) = \begin{bmatrix} k_{11,m}^e(n) & k_{12,m}^e(n) & \cdots & k_{1N,m}^e(n) \\ k_{21,m}^e(n) & k_{22,m}^e(n) & \cdots & k_{2N,m}^e(n) \\ \vdots & \vdots & \cdots & \vdots \\ k_{N1,m}^e(n) & k_{N2,m}^e(n) & \cdots & k_{NN,m}^e(n) \end{bmatrix} \quad (12)$$

$$K_m^r(n) = \begin{bmatrix} k_{11,m}^r(n) & k_{12,m}^r(n) & \cdots & k_{1N,m}^r(n) \\ k_{21,m}^r(n) & k_{22,m}^r(n) & \cdots & k_{2N,m}^r(n) \\ \vdots & \vdots & \cdots & \vdots \\ k_{N1,m}^r(n) & k_{N2,m}^r(n) & \cdots & k_{NN,m}^r(n) \end{bmatrix} \quad (13)$$

In order to illustrate the relation with FIG. 2, the following applies:

$$\vec{r}_0(n) = \vec{r}_0(n) = \tilde{\vec{x}}(n) \text{ and } \tilde{\vec{e}}_p(n) = \tilde{\vec{e}}(n)$$

The reflection or Parcor coefficients are calculated for steady-state signals by minimizing the sum of the N-error signal [intensities]:

$$E[\vec{e}_m^T(n) \cdot \vec{e}_m(n)] \rightarrow \text{Min.} \quad (14)$$

and $$E[\vec{r}_m^T(n) \cdot \vec{r}_m(n)] \rightarrow \text{Min.} \quad (15)$$

The minimum is computed by setting the N×N partial derivatives by the individual reflection coefficients to zero. N×N equations are obtained for the N×N elements of the reflection coefficient matrix. The following computations are limited to equation 14, but also apply to equation 15.

$$\begin{bmatrix} \frac{\partial}{\partial k_{11,m}^e} & \frac{\partial}{\partial k_{12,m}^e} & \cdots & \frac{\partial}{\partial k_{1N,m}^e} \\ \frac{\partial}{\partial k_{21,m}^e} & \frac{\partial}{\partial k_{22,m}^e} & \cdots & \frac{\partial}{\partial k_{2N,m}^e} \\ \vdots & \vdots & \cdots & \vdots \\ \frac{\partial}{\partial k_{N1,m}^e} & \frac{\partial}{\partial k_{N2,m}^e} & \cdots & \frac{\partial}{\partial k_{NN,m}^e} \end{bmatrix} \cdot E[\vec{e}_m^T(n) \cdot \tilde{\vec{e}}_m(n)] \stackrel{!}{=} 0. \quad (16)$$

The zero matrix is on the right-hand side of the equation.

By substituting equation 10 in equation 16, after transformation the following is obtained:

$$-2 \cdot E[\vec{e}_{m-1}(n) \cdot \vec{r}_{m-1}^T(n-1)] + 2 \cdot K_m^e \cdot E[\vec{r}_{m-1}(n-1) \cdot \vec{r}_{m-1}^T(n-1)] \quad (17)$$

The vector products within the expectation values represent dyadic products, so that matrices are obtained again. Equation 17 is therefore also a matrix equation. Solved by $k_m^e$, we obtain:

$$K_m^e = E[\vec{e}_{m-1}(n) \cdot \vec{r}_{m-1}^T(n-1)] \cdot (E[\vec{r}_{m-1}(n-1) \cdot \vec{r}_{m-1}^T(n-1)])^{-1} \quad (18)$$

Similarly, for $K_m^r$:

$$K_m^r = E[\vec{r}_{m-1}(n-1) \cdot \vec{e}_{m-1}^T(n)] \cdot (E[\vec{e}_{m-1}(n) \cdot \vec{e}_{m-1}^T(n)])^{-1} \quad (19)$$

and $$K_m^r = (E[\vec{e}_{m-1}(n) \cdot \vec{r}_{m-1}^T(n-1)])^T \cdot (E[\vec{e}_{m-1}(n) \cdot \vec{e}_{m-1}^T(n)])^{-1} \quad (20)$$

Figure 3:
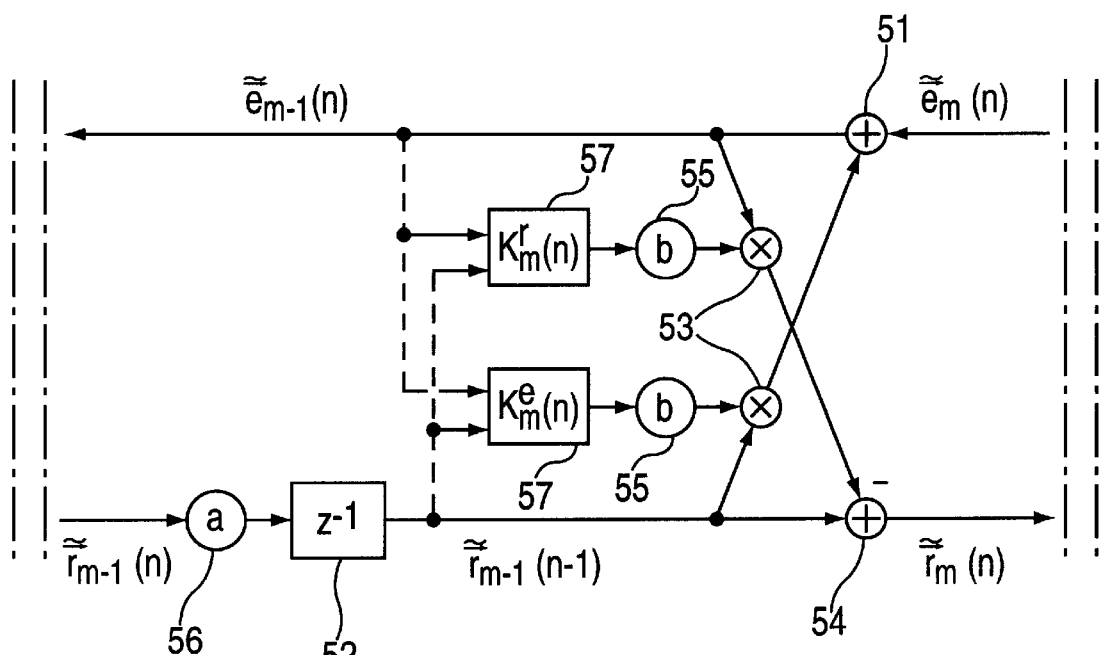
FIG. 3 shows an individual stage of the N-channel predictor according to FIG. 2.
Figure 3A:
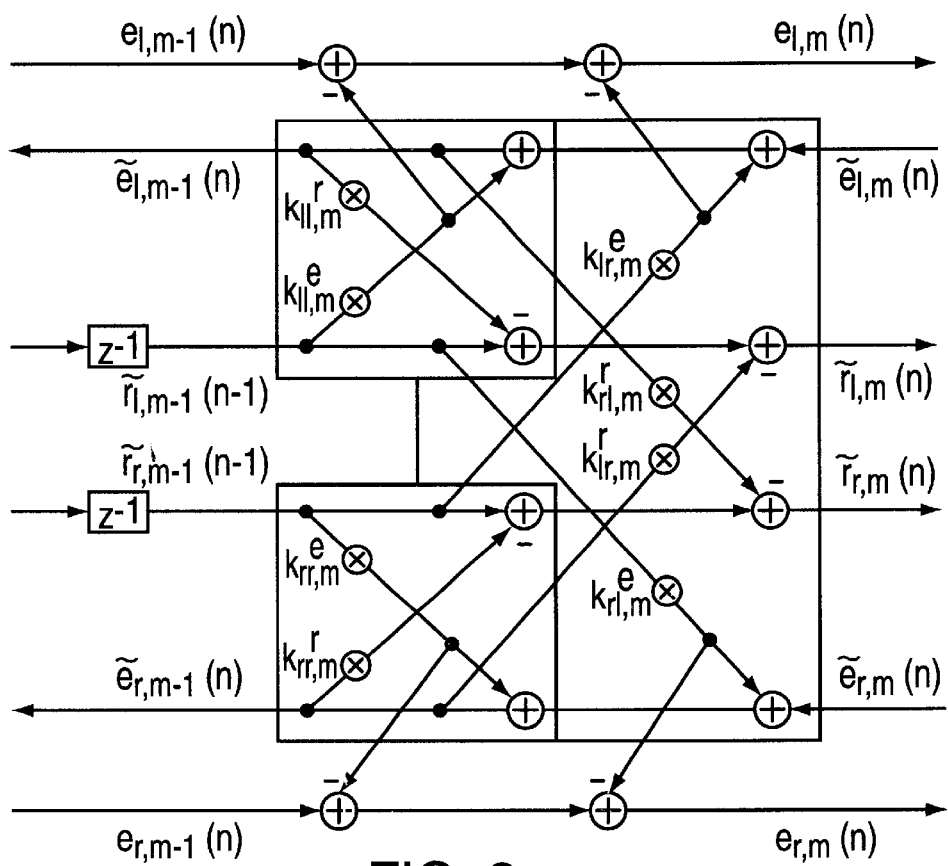
FIG. 3a shows a special case of FIG. 3, in which N=2 for an N-channel predictor that reduces to a stereo predictor, so that FIG. 3a shows the m-th stage of a stereo predictor in a lattice structure (the damping constants being omitted), in which the two smaller shaded blocks mark the still incorporated mono- predictors for each channel, and in which the single larger shaded block marks the additional interchannel components of a stereo predictor.

The mth stage of N-channel predictor 43 is illustrated in more detail in FIG. 3. The same reference numbers denote the same components in FIG. 3 as explained in relation to FIG. 2. In addition, adaptation networks 57 are also shown.

These receive their input signals, shown in dashed lines, exclusively from signals also available in the same stage. We shall explain in detail below, with reference to another embodiment, how adaption is performed. Reference number 55 denotes an attenuation constant b. This attenuation constant is also supplied to multiplicator 53. It should be noted that the attenuation constant is also formulated as a matrix. Then the matrices of the reflection coefficients $K_m^r$, $K_m^e$ are multiplied by the matrices of the attenuation constants b and the respective input vector $\tilde{e}_{m-1}(n)$, $\tilde{r}_{m-1}(n)$. Also upstream from time delay relay 52, a matrix for an attenuation constant a is denoted with the reference number 56. Regarding attenuation constant matrices a and b, it should also be noted that these result from multiplying the unit matrix with a simple attenuation constant, e.g., the numerical value 0.85. The matrices of the attenuation constants a and b therefore only have values different from zero on their diagonals.

The specific case of a dual-channel stereo signal processing and the respective mathematical representation is explained in detail below.

For the case of stereo prediction (N=2), we have with $$\tilde{e}_{m-1}(n) = \begin{bmatrix} \bar{e}_{x,m-1}(n) \\ \bar{e}_{y,m-1}(n) \end{bmatrix}$$

and the simplified form $$\tilde{e}_{m-1}(n) = \begin{bmatrix} \bar{e}_x \\ \bar{e}_y \end{bmatrix}$$

as well as $$\tilde{r}_{m-1}(n-1) = \begin{bmatrix} r_{x,m-1}(n-1) \\ r_{y,m-1}(n-1) \end{bmatrix}$$

and the simplified form $$\tilde{r}_{m-1}(n-1) = \begin{bmatrix} r_x \\ r_y \end{bmatrix}$$

$$K_m^e = \begin{bmatrix} E[\bar{e}_x\ \bar{r}_x] & E[\bar{e}_x\ \bar{r}_y] \\ E[\bar{e}_y\ \bar{r}_x] & E[\bar{e}_y\ \bar{r}_y] \end{bmatrix} \cdot \begin{bmatrix} E[\bar{r}_x\ \bar{r}_x] & E[\bar{r}_x\ \bar{r}_y] \\ E[\bar{r}_y\ \bar{r}_x] & E[\bar{r}_y\ \bar{r}_y] \end{bmatrix}^{-1} \quad (21)$$

$$K_m^e = \frac{1}{E[\bar{r}_x\ \bar{r}_x]E[\bar{r}_y\ \bar{r}_y] - E^2[\bar{r}_x\ \bar{r}_y]} \begin{bmatrix} E[\bar{e}_x\ \bar{r}_x] & E[\bar{e}_x\ \bar{r}_y] \\ E[\bar{e}_y\ \bar{r}_x] & E[\bar{e}_y\ \bar{r}_y] \end{bmatrix}$$

$$\begin{bmatrix} E[\bar{r}_y\ \bar{r}_y] & -E[\bar{r}_x\ \bar{r}_y] \\ -E[\bar{r}_x\ \bar{r}_y] & E[\bar{r}_x\ \bar{r}_x] \end{bmatrix}$$

and $$K_m^r = \begin{bmatrix} E[\bar{e}_x\ \bar{r}_x] & E[\bar{e}_x\ \bar{r}_y] \\ E[\bar{e}_y\ \bar{r}_x] & E[\bar{e}_y\ \bar{r}_y] \end{bmatrix}^T \cdot \begin{bmatrix} E[\bar{e}_x\ \bar{e}_x] & E[\bar{e}_x\ \bar{e}_y] \\ E[\bar{e}_y\ \bar{e}_x] & E[\bar{e}_y\ \bar{e}_y] \end{bmatrix}^{-1} \quad (22)$$

$$K_m^r = \frac{1}{E[\bar{e}_x\ \bar{e}_x]E[\bar{e}_y\ \bar{e}_y] - E^2[\bar{e}_x\ \bar{e}_y]}$$

$$\begin{bmatrix} E[\bar{e}_x\ \bar{r}_x] & E[\bar{e}_y\ \bar{r}_x] \\ E[\bar{e}_x\ \bar{r}_y] & E[\bar{e}_y\ \bar{r}_y] \end{bmatrix}$$

$$\begin{bmatrix} E[\bar{e}_y\ \bar{e}_y] & -E[\bar{e}_x\ \bar{e}_y] \\ -E[\bar{e}_x\ \bar{e}_y] & E[\bar{e}_x\ \bar{e}_x] \end{bmatrix}$$

For the individual matrix coefficients we then have $$k_{xx,m}^e = \frac{E[\bar{e}_x\cdot\bar{r}_x]\cdot E[\bar{r}_y\cdot\bar{r}_y] - E[\bar{e}_x\cdot\bar{r}_y]\cdot E[\bar{r}_x\cdot\bar{r}_y]}{E[\bar{r}_x\cdot\bar{r}_x]\cdot E[\bar{r}_y\cdot\bar{r}_y] - E^2[\bar{r}_x\cdot\bar{r}_y]} \quad (23)$$

$$k_{yx,m}^e = \frac{E[\bar{e}_y\cdot\bar{r}_x]\cdot E[\bar{r}_y\cdot\bar{r}_y] - E[\bar{e}_y\cdot\bar{r}_y]\cdot E[\bar{r}_x\cdot\bar{r}_y]}{E[\bar{r}_x\cdot\bar{r}_x]\cdot E[\bar{r}_y\cdot\bar{r}_y] - E^2[\bar{r}_x\cdot\bar{r}_y]}$$

$$k_{xx,m}^r = \frac{E[\bar{e}_x\cdot\bar{r}_x]\cdot E[\bar{e}_y\cdot\bar{e}_y] - E[\bar{e}_y\cdot\bar{r}_x]\cdot E[\bar{e}_x\cdot\bar{e}_y]}{E[\bar{e}_x\cdot\bar{e}_x]\cdot E[\bar{e}_y\cdot\bar{e}_y] - E^2[\bar{e}_x\cdot\bar{e}_y]}$$

$$k_{yx,m}^r = \frac{E[\bar{e}_x\cdot\bar{r}_y]\cdot E[\bar{e}_y\cdot\bar{e}_y] - E[\bar{e}_y\cdot\bar{r}_y]\cdot E[\bar{e}_x\cdot\bar{e}_y]}{E[\bar{e}_x\cdot\bar{e}_x]\cdot E[\bar{e}_y\cdot\bar{e}_y] - E^2[\bar{e}_x\cdot\bar{e}_y]}$$

$$k_{xy,m}^e = \frac{E[\bar{e}_x\cdot\bar{r}_y]\cdot E[\bar{r}_x\cdot\bar{r}_x] - E[\bar{e}_x\cdot\bar{r}_x]\cdot E[\bar{r}_x\cdot\bar{r}_y]}{E[\bar{r}_x\cdot\bar{r}_x]\cdot E[\bar{r}_y\cdot\bar{r}_y] - E^2[\bar{r}_x\cdot\bar{r}_y]}$$

$$k_{yy,m}^e = \frac{E[\bar{e}_y\cdot\bar{r}_y]\cdot E[\bar{r}_x\cdot\bar{r}_x] - E[\bar{e}_y\cdot\bar{r}_x]\cdot E[\bar{r}_x\cdot\bar{r}_y]}{E[\bar{r}_x\cdot\bar{r}_x]\cdot E[\bar{r}_y\cdot\bar{r}_y] - E^2[\bar{r}_x\cdot\bar{r}_y]}$$

$$k_{xy,m}^r = \frac{E[\bar{e}_y\cdot\bar{r}_x]\cdot E[\bar{e}_x\cdot\bar{e}_x] - E[\bar{e}_x\cdot\bar{r}_x]\cdot E[\bar{e}_x\cdot\bar{e}_y]}{E[\bar{e}_x\cdot\bar{e}_x]\cdot E[\bar{e}_y\cdot\bar{e}_y] - E^2[\bar{e}_x\cdot\bar{e}_y]}$$

$$k_{yy,m}^r = \frac{E[\bar{e}_y\cdot\bar{r}_y]\cdot E[\bar{e}_x\cdot\bar{e}_x] - E[\bar{e}_x\cdot\bar{r}_y]\cdot E[\bar{e}_x\cdot\bar{e}_y]}{E[\bar{e}_x\cdot\bar{e}_x]\cdot E[\bar{e}_y\cdot\bar{e}_y] - E^2[\bar{e}_x\cdot\bar{e}_y]}$$

To adapt the coefficients in equation 23 to the instantaneous signal characteristics, the expectation values in equations 21 through 23 used for optimization are substituted by measured averages over a limited period of signal history. In the case of stereo signal processing, a limited period of signal history can be, for example, the signals during a few ms up to 100 ms for averaging. A compromise may be found between good convergence to the optimum predictor setting in signal segments with quasi-steady-state signal character and the capability to quickly adapt to changed signal characteristics in the sense of short-term statistics. In this connection, algorithms for which the estimation values of the required parameters are improved iteratively, i.e., from one sampled value to another, can be used. Such algorithms include the conventional LMS (least mean square) or RLS (recursive least mean square) algorithms. These algorithms are also described in the book by P. Strohbach "Linear Prediction Theory," Springer Verlag, 1990.

In the following the adaption of the coefficients $k^e_{xy,m}$ and $k^r_{xy,m}$ is explained using the example of the LMS algorithm. The expectation values are replaced as follows by plausible estimates, which can be computed recursively:

$$E[\tilde{e}_{x,m-1}(n)\cdot \bar{r}_{y,m-1}(n-1)] \rightarrow C_{xy,m}(n)$$

$$E[\tilde{e}_{x,m-1}(n)\cdot \bar{e}_{y,m-1}(n)] \rightarrow D_{xy,m}^e(n)$$

$$E[\tilde{r}_{x,m-1}(n-1)\cdot \bar{r}_{y,m-1}(n-1)] \rightarrow D_{xy,m}^r(n) \quad (24)$$

where $$C_{xy,m}(n) = (1-\beta)\cdot C_{xy,m}(n-1) + \beta\cdot \tilde{e}_{x,m-1}(n)\cdot \tilde{r}_{y,m-1}(n-1)$$

$$D_{xy,m}^e(n) = (1-\beta)\cdot D_{xy,m}^e(n-1) + \beta\cdot \tilde{e}_{x,m-1}(n)\cdot \tilde{e}_{y,m-1}(n)$$

$$D_{xy,m}^r(n) = (1-\beta)\cdot D_{xy,m}^r(n-1) + \beta\cdot \tilde{r}_{x,m-1}(n31\ 1)\cdot \tilde{r}_{y,m-1}(n-1) \quad (25)$$

Here, $\beta$ is an adaption time constant, which determines the influence of the instantaneous sampled values on the expectation value estimates. It should be optimized in particular as a function of the sampling frequency of the respective predictor input signal, which may be done experimentally for a given coding algorithm. Thus the following equations are obtained for determining the above-mentioned reflection coefficients:

$$k^e_{xy,m} = \frac{C_{xy,m}(n) \cdot D^r_{xx,m}(n) - C_{xx,m}(n) \cdot D^r_{xy,m}(n)}{D^r_{xx,m}(n) \cdot D^r_{yy,m}(n) - (D^r_{xy,m}(n))^2} \qquad (26)$$

$$k^r_{xy,m} = \frac{C_{yx,m}(n) \cdot D^e_{xx,m}(n) - C_{xx,m}(n) \cdot D^e_{xy,m}(n)}{D^e_{xx,m}(n) \cdot D^e_{yy,m}(n) - (D^e_{xy,m}(n))^2}. \qquad (27)$$

$C_{xx,m}(n)$, $D^e_{xx,m}(n)$, and $D^r_{xx,m}(n)$ are obtained as in equations 24 and 25. For the remaining coefficients, similar formulas are used, which are not individually explained in detail. The resulting formulas are implemented in each predictor stage by adaption networks 57 as illustrated in FIG. 3. For this purpose, a suitably programmed microcomputer may be used. The optimum values of the attenuation constants a and b can also be determined experimentally. They allow the effects of transmission errors to be reduced more rapidly.

Figure 4:
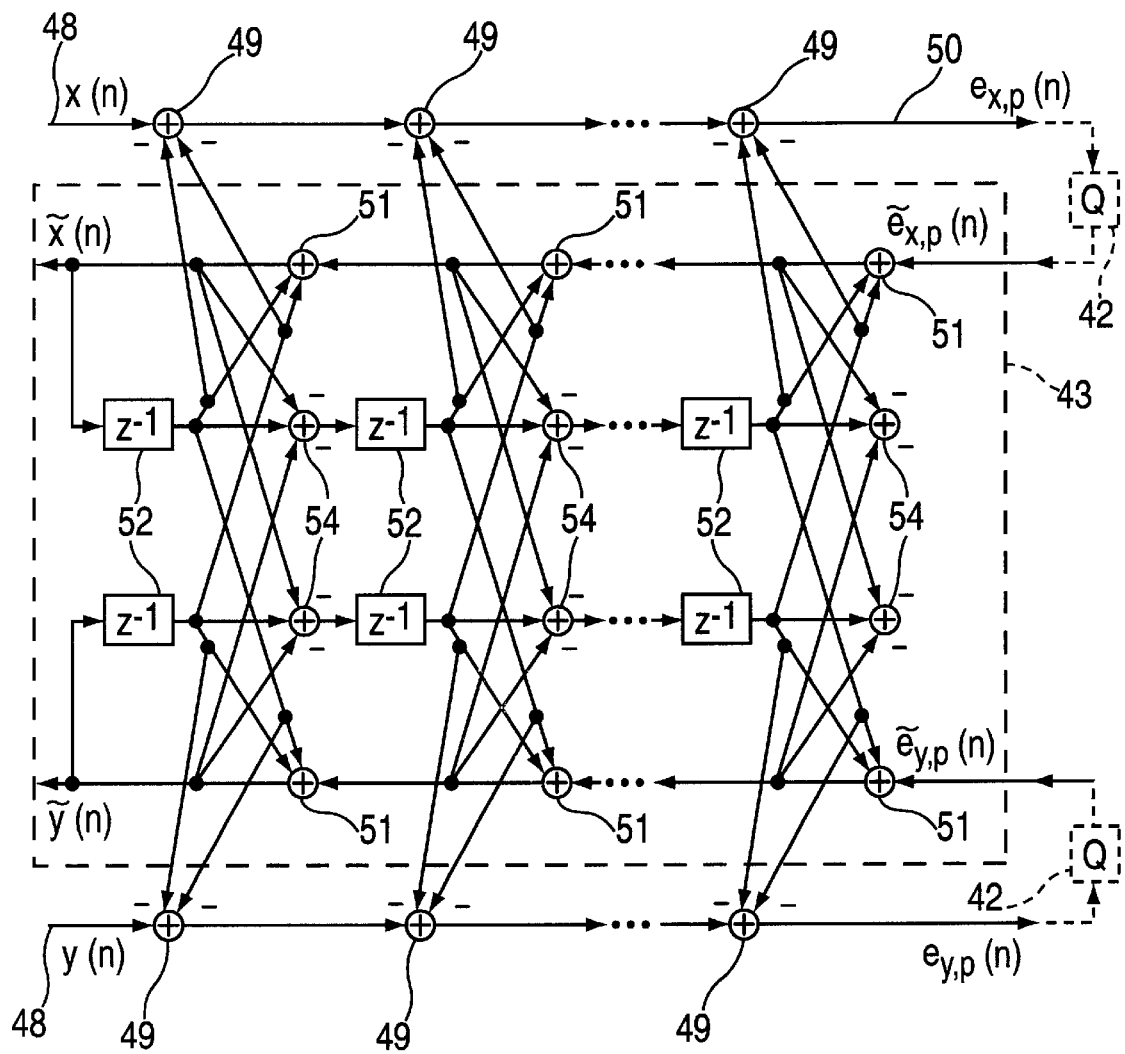
FIG. 4 shows a simplified schematic of a $P^{th}$-order backward-adaptive stereo predictor with lattice-type structure in accordance with the present invention.

FIG. 4 shows the simplified diagram of a Pth order dual-channel stereo predictor with a backward-adaptive lattice-type structure. Both channels x(n) and y(n) are shown individually. The same reference numbers denote the same components in FIG. 4 as in FIGS. 1, 2, and 3, as explained with reference to FIGS. 1, 2, and 3. They are therefore not explained in detail here. For the sake of clarity, the multiplication by the reflection coefficients and the respective adaption networks and attenuation constants are not illustrated. They should be added for completion as shown in FIG. 3.

In this case the following formulas apply to the recursion equations of the lattice-type structure:

$$\vec{\tilde{e}}_m(n) = \vec{\tilde{e}}_{m-1}(n) - K^e_m \cdot \vec{\tilde{r}}_{m-1}(n-1) \qquad (28)$$

$$\begin{bmatrix} \tilde{e}_{x,m}(n) \\ \tilde{e}_{y,m}(n) \end{bmatrix} = \begin{bmatrix} \tilde{e}_{x,m-1}(n) \\ \tilde{e}_{y,m-1}(n) \end{bmatrix} - \begin{bmatrix} k^e_{xx,m}(n) & k^e_{xy,m}(n) \\ k^e_{yx,m}(n) & k^e_{yy,m}(n) \end{bmatrix} \cdot \begin{bmatrix} \tilde{r}_{x,m-1}(n-1) \\ \tilde{r}_{y,m-1}(n-1) \end{bmatrix}$$

$$\tilde{e}_{x,m}(n) = \tilde{e}_{x,m-1}(n) - k^e_{xx,m}(n) \cdot \tilde{r}_{x,m-1}(n-1) - k^e_{xy,m}(n) \cdot \tilde{r}_{y,m-1}(n-1)$$

$$\tilde{e}_{y,m}(n) = \tilde{e}_{y,m-1}(n) - k^e_{yx,m}(n) \cdot \tilde{r}_{x,m-1}(n-1) - k^e_{yy,m}(n) \cdot \tilde{r}_{y,m-1}(n-1)$$

and $$\vec{\tilde{r}}_m(n) = \vec{\tilde{r}}_{m-1}(n-1) - K^r_m \cdot \vec{\tilde{e}}_{m-1}(n) \qquad (29)$$

$$\begin{bmatrix} \tilde{r}_{x,m}(n) \\ \tilde{r}_{y,m}(n) \end{bmatrix} = \begin{bmatrix} \tilde{r}_{x,m-1}(n-1) \\ \tilde{r}_{y,m-1}(n-1) \end{bmatrix} - \begin{bmatrix} k^r_{xx,m}(n) & k^r_{xy,m}(n) \\ k^r_{yx,m}(n) & k^r_{yy,m}(n) \end{bmatrix} \cdot \begin{bmatrix} \tilde{e}_{x,m-1}(n) \\ \tilde{e}_{y,m-1}(n) \end{bmatrix}$$

$$\tilde{r}_{x,m}(n) = \tilde{r}_{x,m-1}(n-1) - k^r_{xx,m}(n) \cdot \tilde{e}_{x,m-1}(n) - k^r_{xy,m}(n) \cdot \tilde{e}_{y,m-1}(n)$$

$$\tilde{r}_{y,m}(n) = \tilde{r}_{y,m-1}(n-1) - k^r_{yx,m}(n) \cdot \tilde{e}_{x,m-1}(n) - k^r_{yy,m}(n) \cdot \tilde{e}_{y,m-1}(n)$$

where the reflection coefficients of the matrices $k_m^e$ and $k_m^r$ are calculated as explained with reference to equations 26 and 27.

Figure 5:
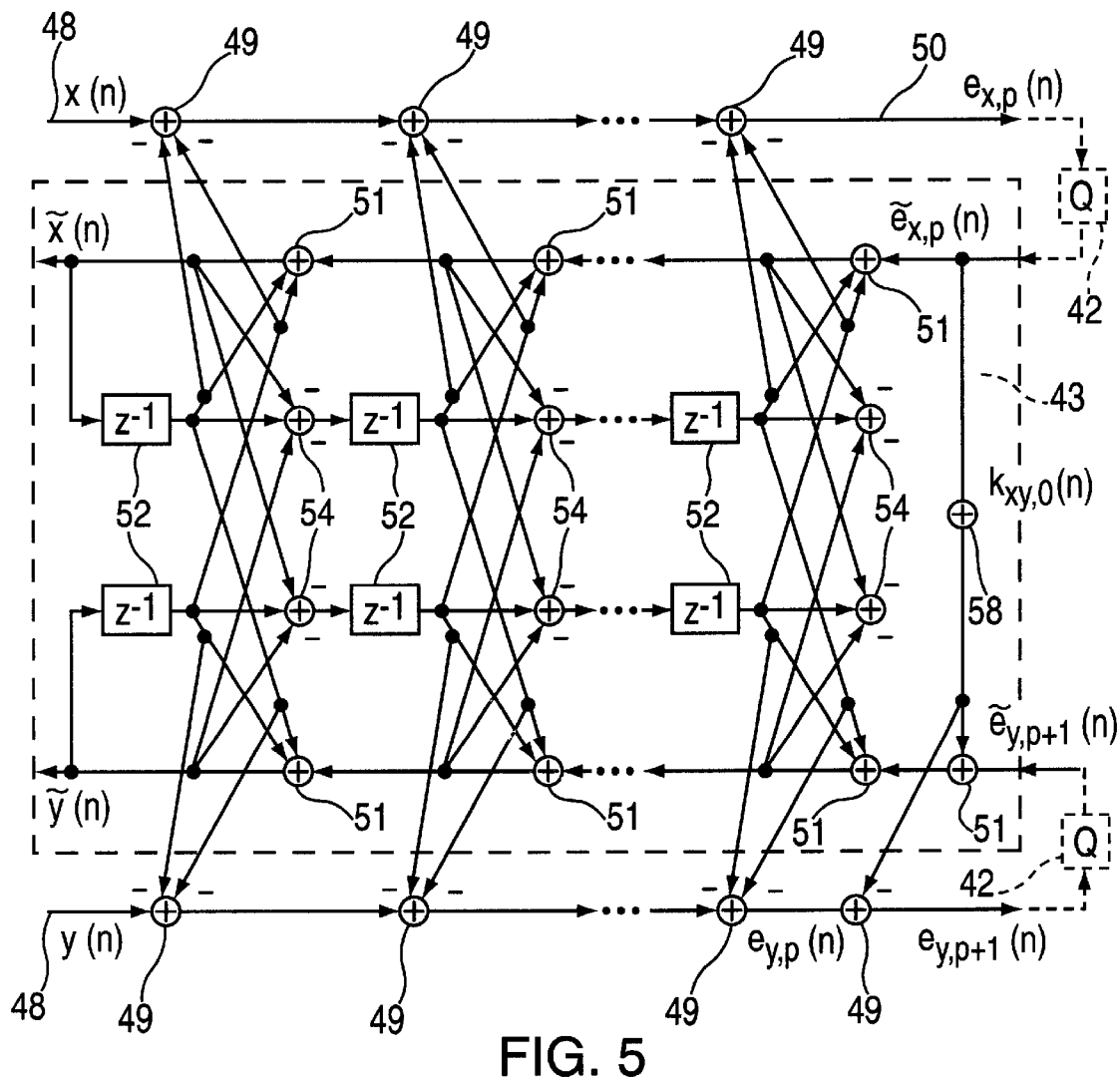
FIG. 5 shows a simplified schematic of a $P^{th}$-order backward-adaptive stereo predictor with lattice-type structure which additionally takes into account the correlation between simultaneous sampled values of both signals in accordance with the present invention.

In the structure illustrated in FIG. 4 of a dual-channel backward-adaptive stereo predictor, the correlations between simultaneous sampled values of both channels x and y are not taken into account. In order to also take these correlations into account, it is suggested that a zero-order inter-channel predictor be connected downstream as shown in FIG. 5. The signal generated by quantizer 42 of the X channel is multiplied by the coefficients $key_{xy,0}(n)$ in multiplicator 58. The result of the multiplication is then added to the respective input values in adders 51 and 49 as shown by the arrows. The formula for calculating the inter-channel predictor is the following:

$$\bar{e}_{y,P+1}(n) = \tilde{e}_{y,P}(n) - k_{xy,0}(n) \cdot \bar{e}_{x,P}(n). \qquad (30)$$

Coefficients $k_{xy,0}(n)$ are calculated from the condition of minimum error intensity for the quantized prediction error signal $e_{y,P+1}(n)$.

$$E[\bar{e}_{y,P+1}^2(n)] = E[(\bar{e}_{y,P}(n) - k_{xy,0}(n) \cdot \bar{e}_{x,P}(n))^2] \to \min. \qquad (31)$$

Minimization, as given in equation 31, is performed by setting the derivative by $k_{xy,0}(0)$ of the error intensity to zero.

$$\frac{\partial}{\partial k_{xy,0}(n)} E[\bar{e}_{y,P+1}^2(n)] = E[2 \cdot \tilde{e}_{y,P+1}(n) \cdot (-\bar{e}_{x,P}(n))] \stackrel{!}{=} 0$$

provides $$E[-2 \cdot (\bar{e}_{y,P}(n) - k_{xy,0}(n) \cdot \bar{e}_{x,P}(n)) \cdot \bar{e}_{x,P}(n)] = 0,$$

i.e., $$k_{xy,0}(n) \cdot E[\bar{e}_{x,P}^2(n)] = E[\tilde{e}_{y,P}(n) \cdot \bar{e}_{x,P}(n)] \qquad (32)$$

$$k_{xy,0}(n) = \frac{E[\tilde{e}_{y,P}(n) \cdot \bar{e}_{x,P}(n)]}{E[\bar{e}_{x,P}^2(n)]}$$

These equations can be derived similarly for the N-channel case.

Figure 6:
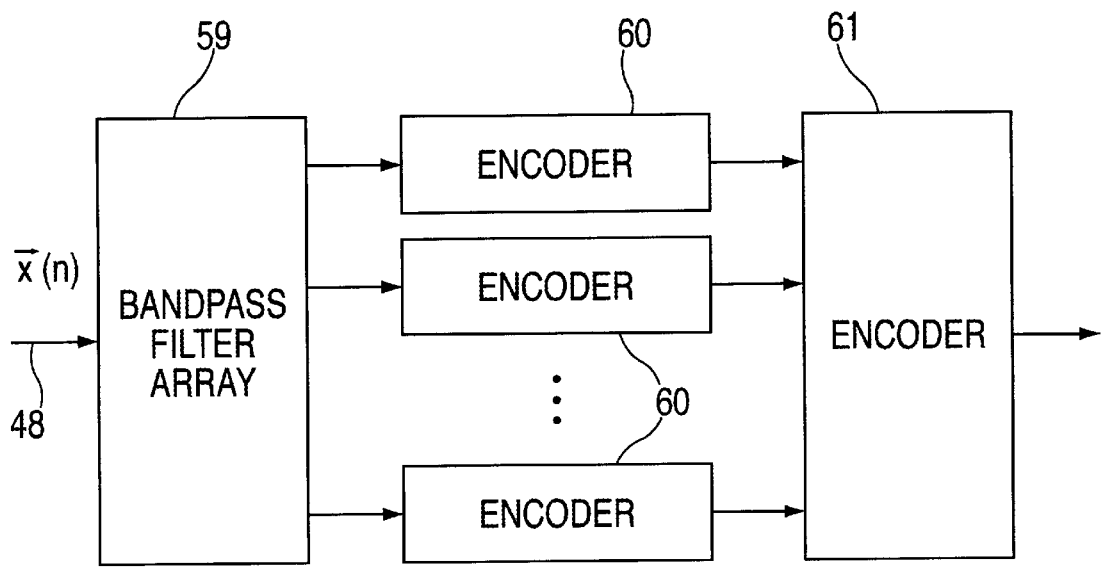
FIG. 6 shows a block diagram of an N-channel subband coder with an N-channel predictor in accordance with the present invention.

In the following we shall explain a specific implementation of signal encoding with the N-channel predictor according to the present invention in more detail. In FIG. 6, the N-channel input signal $\vec{x}(n)$ appears at an input 48 of an encoder. Signal $\vec{x}(n)$ contains the digitized sampled values at sampling time n. Filter array 59 comprises a number of bandpass filters for decomposing the signal that appears into various spectral components. In the case of coding of stereo audio signals, for example, in the ISO/IEC Standard "International Standard IS 1172: Information technology-coding of moving pictures and associated audio for digital storage media at up to about 1.5 Mbit/s," ISO/IEC JTC1/SC29, Geneva, August 1993, also referred to as MPEG/Audio standard, it is recommended for layer 2 that the audio signal spectrum from 0 to 24 kHz be decomposed into 32 subbands of equal widths. In FIG. 6, each one of encoder circuits 60 in the appropriate number comprises a predictor and quantizers as shown in FIG. 1. The quantized prediction error signals obtained are finally encoded by the method in a circuit 61, where the bit streams with the respective blocks are also formed. The function of this circuit is, however, described in detail in the aforementioned ISO standard. To optimize the arrangement according to FIG. 6, it is advantageous that each predictor be individually controlled. In backward adaptive systems, short-term prediction failures may occur, for example, if the signal statistics change due to a signal change. In this case, the original sampled values should be used, since the predictor has to adapt anew. Therefore, individual adaptors or groups of adapters may be switched off, i.e., only have them active if a prediction gain can be achieved. In addition, it can also be advantageous to vary the predictor length, i.e., the number of basic predictor stages. Thus, a predictor may become unstable when the predictor length increases. This may be checked in the encoder and the predictor length may be switched to a shorter one. This then requires additional controls in the encoder and the transmission of the respective control parameter as lateral information in the bit stream, which, however, remains short.

Instead of the filter array, a computer unit performing a transformation, such as a discrete Fourier transformation or a discrete cosine transformation, may also be used in FIG. 6. The spectral components are then the transformation coefficients. For each series of transformation coefficients, a separate predictor must then be used.

Figure 7:
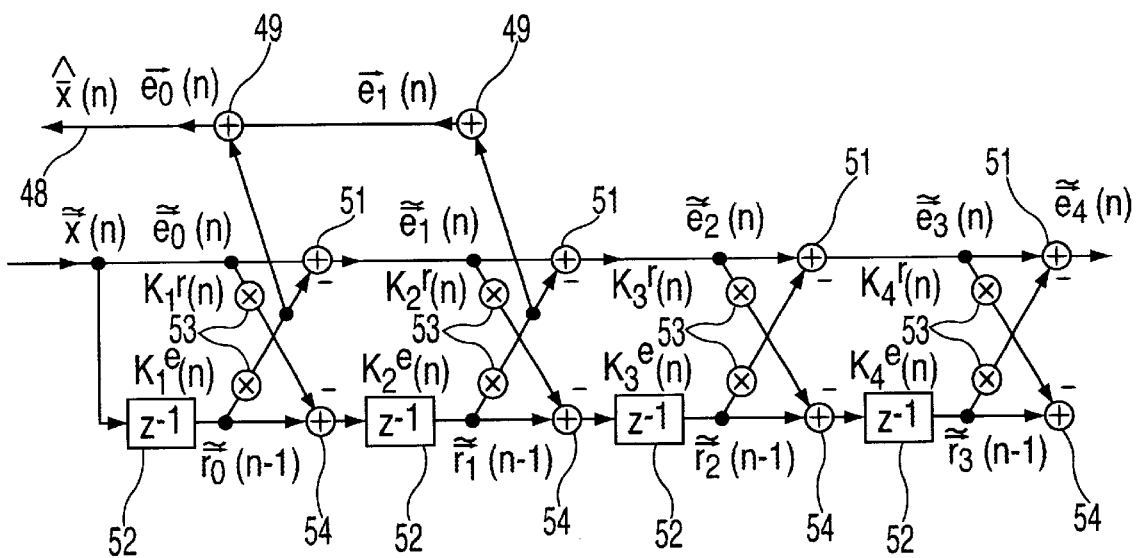
FIG. 7 shows a backward-adaptive N-channel predictor with lattice-type structure with switchable predictor order and continued full adaption of all predictor stages in accordance with the present invention.
Figure 7A:
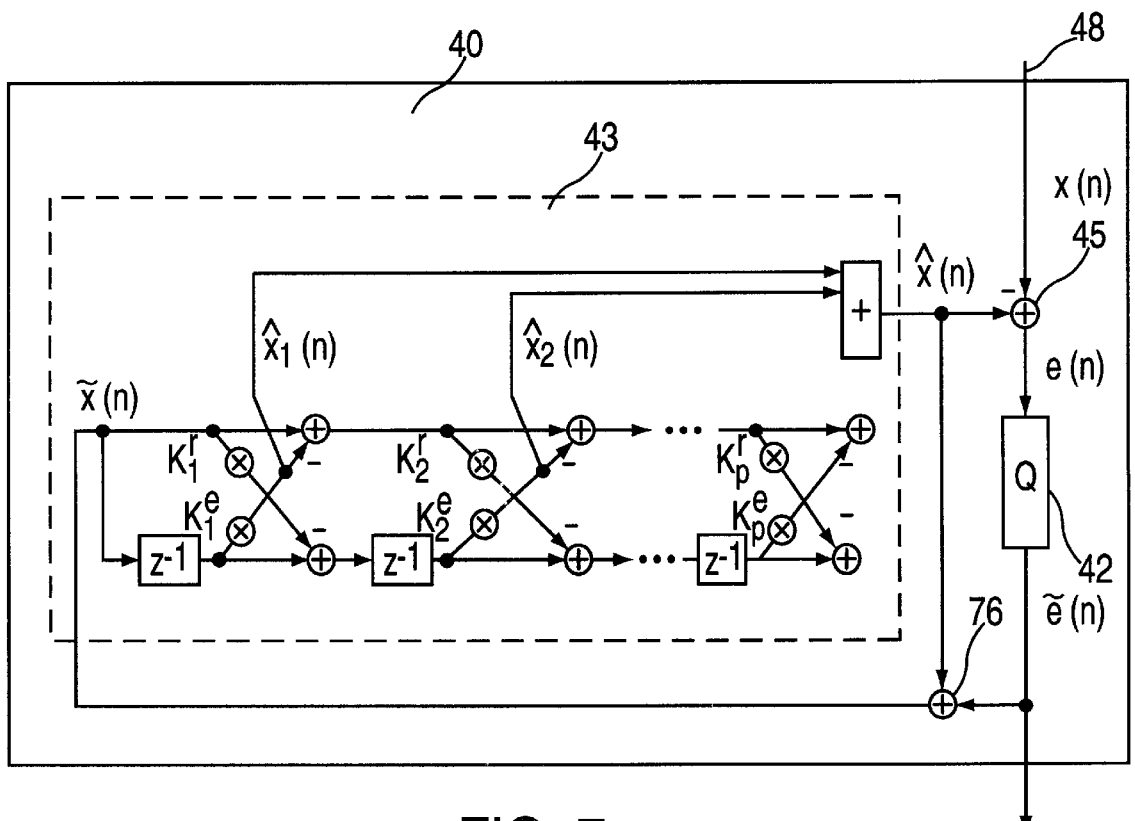
FIG. 7a shows another representation of FIG. 7.

One problem when a predictor is switched off or switched over lies in the fact that, when it is switched on again, the entire predictor, or the higher stages that have been switched off, must be adapted anew, which results in reduced prediction gain. In order to eliminate this problem, the circuit illustrated in FIG. 7 is proposed. Also in this circuit, the same reference numbers denote components identical to those in FIGS. 1 through 6. It is essential that the predictor in FIG. 7 be configured as a dual-stage, backward-adaptive predictor. Then, in the circuit illustrated here, the other two stages of the predictor are operated as backward-adaptive predictors in the feed-forward direction. This allows all coefficients of the predictor to be continuously adapted regardless of whether the predictor is switched off or operated with a shorter than the maximum possible predictor length.

In the general case of N channels, the number of coefficients to be computed per stage increases rapidly with increasing N, since it is proportional to the square of N, so that it may prove to be advantageous from the practical point of view that the N channels be subdivided into subgroups $N=N_1+N_2+\ldots$ and then $N_1$-channel, $N_2$-channel, etc. predictors be used. For the case that is relevant today, N=5, where there are three front channels (left, center, right) and two surround channels (left-surround, right-surround), for example, a subdivision into a 3-channel predictor for the front channels and a 2-channel predictor for the surround channels is possible. Thus the number of coefficients per stage is reduced from 2×25=50 to 2×4+2×9=26.

The linear backward-adaptive N-channel predictors described here may be used in many different manners. Thus, applications such as transmission of video or audio signals over the ISDN are conceivable. Other applications include, for example, the transmission of digital audio signals with the help of Digital Audio Broadcasting (DAS). The predictors may also be used in data transmission over computer networks, in particular in multimedia applications.

Such predictors may be integrated in an audio codec, and, in particular, integrated in ISO MPEG layer 2 and ISO MPEG layer 3. The ISO MPEG layer 2 codec is based on a subband decomposition of the 750 Hz band width into 32 subbands of equal widths with the subband sampling frequency of 1.5 kHz. A backward-adaptive stereo predictor that can be switched off or to another predictor length may be used for each partial stereo band. In this codec, each block may be scaled to one of 36 subband sampled values, quantized, and coded in each channel. Quantization for a block is known from the beginning of the block for backward-adaptive prediction. Since this, in turn, depends on the prediction error values, prediction, scaling, and quantization is performed iteratively. The bit allocation algorithm responsible for the selection of the quantizer is adapted so that the prediction gains are taken into account when assigning bits. With the values $\beta=2^{-6}$ for the adaption time constant and $a=1-2\beta$ and $b=1-\beta$ for the attenuation constants, the previously most critical test signals were measured when coding at a data rate of 2*64=128 kbit/s average coding gain compared to layer 2 without prediction in the range of 45 to 60 kbit/s. The subjective audio quality was considerably improved.

The ISO MPEG layer 3 codec is based on a subband decomposition with subsequent transformation, whose output delivers 576 spectral coefficients. The coefficients are 12 ms apart, which corresponds to a "subband sampling frequency" of approximately 83 Hz. For encoding, the 576 spectral coefficients are combined to form so-called scale factor bands, whose band widths approximately correspond to audible range of frequency groups.

For each series of stereo coefficients, a backward-adaptive stereo predictor is used, i.e., a total of 576 predictors, which may be switched off by scale factor band. In the case of signal changes, the frequency resolution in codec layer 3 is reduced to 192 spectral coefficients. Prediction is switched off here and is only activated upon transition to 576 coefficients. The integration of stereo prediction in layer 3 is relatively uncomplicated, since quantization is performed coefficient by coefficient due to the processing structure. With the values $\beta=0.1$ for the adaption time constant and a=b=0.85 for the attenuation constants, the previously most critical test signals can be measured in encoding at a data rate of 2×64=128 kbit/s average coding gain compared to layer 3 without prediction in the range of 25 to 35 kbit/s. The lower coding gain compared to layer 2 is explained by the fact that layer 3 has a greater coding efficiency compared to layer 2. The subjective audio quality was improved also in this case.

What is claimed is:

1. A method for coding a multichannel signal, the multichannel signal being in a digitized form, comprising the steps of:

performing a linear, backward-adaptive prediction on the multichannel signal to form a predicted signal, the linear, backward-adaptive prediction being performed in a plurality of stages, each of the plurality of stages having a lattice structure, at least one of the plurality of stages capable of being switched off, the performing step including the steps of
in each of the plurality of stages, computing a respective component value,
subtracting each respective component value from the multichannel signal to form the predicted signal,
determining whether the at least one of the plurality of stages can achieve a performance gain,
if the at least one of the plurality of stages cannot achieve a performance gain, switching off the at least one of the plurality of stages,
for each of the plurality of stages, determining at least one respective predictor coefficient,
for each of the plurality of stages, adapting the at least one respective predictor coefficient regardless of whether the at least one of the plurality of stages is switched off,
for each of the at least one of the plurality of stages that is switched off, operating as a backward-adaptive predictor in a forward-feed direction, and forming a prediction error signal as a function of the multichannel signal and the predicted signal;

quantizing the prediction error signal; and loading the quantized prediction error signal for transmission over a transmission path;

wherein the prediction error signal does not depend on the at least one of the plurality of stages that is switched off and that continues to be adapted.

2. The method according to claim 1, wherein the prediction error signal includes a plurality of error signal intensity values, and the step of determining the at least one respective predictor coefficient includes the steps of:

summing the plurality of error signal intensity values; and determining the minimum of the sum of the plurality of the error signal intensity values for determining each of the at least one respective predictor coefficient.

3. The method according to claim 1, wherein the prediction error signal includes a plurality of error signal intensity values, and the step of determining the at least one respective predictor coefficient includes the steps of:

summing the plurality of error signal intensity values; and determining the minimum of the sum of the plurality of the error signal intensity values for determining each of the at least one respective predictor coefficient.

4. A method for coding a multichannel signal, the multichannel signal being in a digitized form, comprising the steps of:

performing a linear, backward-adaptive prediction on the multichannel signal to form a predicted signal, the linear, backward-adaptive prediction being performed in a plurality of stages, each of the plurality of stages having a lattice structure, at least one of the plurality of stages capable of being switched off, the performing step including the steps of in each of the plurality of stages, computing a respective component value, subtracting each respective component value from the multichannel signal to form the predicted signal, determining whether the at least one of the plurality of stages can achieve a performance gain, if the at least one of the plurality of stages cannot achieve a performance gain, switching off the at least one of the plurality of stages, for each of the plurality of stages, determining at least one respective predictor coefficient, and for each of the plurality of stages, adapting the at least one respective predictor coefficient regardless of whether the at least one of the plurality of stages is switched off; and forming a prediction error signal as a function of the multichannel signal and the predicted signal;

quantizing the prediction error signal; and loading the quantized prediction error signal for transmission over a transmission path;

wherein the prediction error signal does not depend on the at least one of the plurality of stages that is switched off and that continues to be adapted.

5. The method according to claims 4, wherein the step of determining at least one respective predictor coefficient includes the steps of:

determining statistical linkages between simultaneous sampled values of at least two channels of the multichannel signal in a downstream zero-order interchannel predictor; and determining the at least one predictor coefficient as a function of the statistical linkages.

6. The method according to claim 4, further comprising the steps of:

decomposing the multichannel signal into a plurality of spectral components; and performing the linear, backward-adaptive prediction on each of the plurality of spectral components separately.

7. The method according to claim 4, the multichannel signal includes at least one of a video signal and an audio signal.

8. A device for decoding a multichannel signal, the multichannel signal having been redundance reduced by a linear, backward-adaptive technique, the device comprising:

a linear, backward-adaptive predictor for providing a prediction error signal, the linear backward-adaptive predictor receiving a plurality of quantized prediction values for each of the channels of the multichannel signal, the linear, backward-adaptive predictor including a plurality of stages, each of the plurality of stages determining a component that is deducted from a digital value in a respective channel of the multichannel signal, each of the plurality of stages having a lattice-type structure, wherein at least one of the plurality of stages is capable of being switched off when a prediction gain cannot be achieved, wherein when the at least one of the plurality of stages is switched off the at least one of the plurality of stages operates as a backward-adaptive predictor in the forward-feed direction, and wherein each one of the plurality of stages adapts at least one respective predictor coefficient regardless of whether the at least one of the plurality of stages is switched off wherein the prediction error signal does not depend on the at least one of the plurality of stages that is switched off and that continues to be adapted.

9. The device according to claim 8, wherein the linear, backward-adaptive predictor includes a zero-order interchannel predictor, the zero-order interchannel predictor determining statistical linkages between simultaneously sampled values of at least two channel of the multichannel signal.

10. The device according to claim 8, wherein the multichannel signal includes a plurality of subbands, further comprising:

a plurality of linear, backward-adaptive predictors, each of the plurality of linear, backward-adaptive predictors corresponding to a different one of the plurality of subbands, wherein each of plurality of linear, backward-adaptive predictors is capable of being switched off independent of the others of the plurality of linear, backward-adaptive predictors.

11. The method according to claim 1, wherein the respective component value corresponds to a predictor output value.

12. The method according to claim 2, wherein the plurality of error signal intensity values is a plurality of expectation values.

13. The method according to claim 12, wherein the plurality of expectation values includes at least one of: a plurality of expectation values of one channel of the multichannel signal and a plurality of expectation values of at least two channels of the multichannel signal.

14. The method according to claim 3, wherein the plurality of error signal intensity values is a plurality of measured averages over time over a limited past signal history.

15. The method according to claim 14, wherein the plurality of measured averages over time over a limited past signal history is at least one of: a plurality of measured averages over time over a limited past signal history of one channel of the multichannel signal and a plurality of measured averages over time over a limited past signal history of at least two channels of the multichannel signal.

16. A method for coding a signal, the signal being in a digitized form, comprising the steps of:

performing a linear, backward-adaptive prediction on the signal to form a predicted signal, the linear, backward-adaptive prediction being performed in a plurality of stages, each of the plurality of stages having a lattice structure, at least one of the plurality of stages capable of being switched off, the performing step including the steps of in each of the plurality of stages, computing a respective component value, subtracting each respective component value from the signal to form the predicted signal, determining whether the at least one of the plurality of stages can achieve a performance gain, if the at least one of the plurality of stages cannot achieve a performance gain, switching off the at least one of the plurality of stages, for each of the plurality of stages determining at least one respective predictor coefficient, for each of the plurality of stages, adapting the at least one respective predictor coefficient regardless of whether the at least one of the plurality of stages is switched off, for each of the at least one of the plurality of stages that is switched off, operating as a backward-adaptive predictor in a forward-feed direction, and forming a prediction error signal as a function of the signal and the predicted signal;

quantizing the prediction error signal; and loading the quantized prediction error signal for transmission over a transmission path;

wherein the prediction error signal does not depend on the at least one of the plurality of stages that is switched off and that continues to be adapted.

* * * * *

UNITED STATES PATENT AND TRADEMARK OFFICE
CERTIFICATE OF CORRECTION

PATENT NO. : 6,360,200 B1
DATED : March 19, 2002
INVENTOR(S) : Edler, Bernd et al.

It is certified that error appears in the above-identified patent and that said Letters Patent is hereby corrected as shown below:

Column 3,
Line 49, change "$\tilde{e}(n)$" to -- $\tilde{\tilde{e}}(n)$ --

Lines 52, 61, 64 and 66, change "$\tilde{x}(n)$" to -- $\tilde{\tilde{x}}(n)$ --

Line 53, change "$\tilde{e}(n)$" to -- $\tilde{\tilde{e}}(n)$ --

Column 4,
Line 37, change "$\tilde{x}(n)$" to -- $\tilde{\tilde{x}}(n)$ --

Column 5
Line 55, change

"$\vec{e} \ldots \vec{e} \ldots \vec{r} \ldots \vec{r} \ldots \vec{r} \ldots \vec{e}$" to -- $\tilde{\vec{e}} \ldots \tilde{\vec{e}} \ldots \tilde{\vec{r}} \ldots \tilde{\vec{r}} \ldots \tilde{\vec{r}} \ldots \tilde{\vec{e}}$ --

Column 6,
Line 18, change

"$-_o(n) = r_o(n) = x(n)$ and $e_p(n) = e(n)$"

to -- $\tilde{\phantom{e}}_{e_o}(n) = \tilde{\phantom{r}}_{r_o}(n) = \tilde{\phantom{x}}_x(n)$ and $\tilde{\phantom{e}}_{e_p}(n) = \tilde{\phantom{e}}_e(n)$ --

Line 48, change

"$\ldots \vec{\vec{r}}_{m-1}{}^T \ldots \vec{\vec{r}}_{m-1}{}^T = (017)$" to

-- $\ldots \vec{\vec{r}}_{m-1}^T \ldots \vec{\vec{r}}_{m-1}^T = 0 \qquad (17)$ --

Line 55, change "$\ldots \vec{\vec{r}}_{m-1}{}^T \ldots \vec{\vec{r}}_{m-1}{}^T$" to -- $\vec{\vec{r}}_{m-1}^T \ldots \vec{\vec{r}}_{m-1}^T$ --

Line 58, change "$\vec{\tilde{e}}_{m-1}{}^T \ldots \vec{\tilde{e}}_{m-1}{}^T$" to -- $\tilde{\vec{e}}_{m-1}^T \ldots \tilde{\vec{e}}_{m-1}^T$ --

Line 62, change "$\vec{\tilde{r}}_{m-1}{}^T \ldots \vec{\tilde{r}}_{m-1}{}^T$" to -- $\tilde{\vec{r}}_{m-1}^T \ldots \tilde{\vec{r}}_{m-1}^T$ --

UNITED STATES PATENT AND TRADEMARK OFFICE
CERTIFICATE OF CORRECTION

PATENT NO. : 6,360,200 B1
DATED : March 19, 2002
INVENTOR(S) : Edler, Bernd et al.

It is certified that error appears in the above-identified patent and that said Letters Patent is hereby corrected as shown below:

Column 7,
Line 10, change "$\widetilde{e}_{m-1}{}^{(n)}, \widetilde{r}_{m-1}{}^{(n)}$" to -- $\widetilde{e}_{m-1}^{(n)}, \widetilde{r}_{m-1}^{(n)}$ --

Column 8,
Line 49, change "$D_{xy,m}{}^e$" to -- $D_{xy,m}^e$ --

Line 50, change "$D_{xy,m}{}^r$" to -- $D_{xy,m}^r$ --

Column 9,
Line 63 change "$key_{xy,o(n)}$" to -- $k_{xy,o(n)}$ --

Signed and Sealed this

Seventeenth Day of June, 2003

JAMES E. ROGAN
*Director of the United States Patent and Trademark Office*